United States Patent
Myrland

(10) Patent No.: US 6,351,910 B1
(45) Date of Patent: Mar. 5, 2002

(54) APPARATA AND METHODS FOR SUBMERGED PLANT STEM CUTTING

(75) Inventor: James W. Myrland, Verona, WI (US)

(73) Assignee: Rainbow Group LLC, Middleton, WI (US)

( * ) Notice: Subject to any disclaimer, the term of this patent is extended or adjusted under 35 U.S.C. 154(b) by 0 days.

(21) Appl. No.: 09/501,426

(22) Filed: Feb. 10, 2000

Related U.S. Application Data

(60) Provisional application No. 60/119,996, filed on Feb. 12, 1999.

(51) Int. Cl.[7] ............................................. A01K 3/037

(52) U.S. Cl. .................................... 47/1.01 R; 47/58.1

(58) Field of Search ................................ 47/1.01, 58.1; 30/113, 124, 278, 280, 282

(56) References Cited

U.S. PATENT DOCUMENTS

| | | |
|---|---|---|
| 1,359,148 A | 11/1920 | Bertrand |
| 2,646,621 A | 7/1953 | Catanese |
| 2,747,330 A | 5/1956 | Simpkins |
| 2,763,926 A | 9/1956 | Pate |
| 3,911,577 A | 10/1975 | Nickel |
| 4,348,832 A | 9/1982 | Hauser |
| 4,462,126 A * | 7/1984 | Cleaveland ................... 4/619 |
| 4,486,905 A * | 12/1984 | Felly ......................... 47/1.01 |
| 4,928,424 A | 5/1990 | Campanelli et al. |
| 5,174,794 A * | 12/1992 | Brownlee et al. ............ 47/1.01 |
| 5,391,208 A | 2/1995 | Weder et al. |
| 5,497,577 A | 3/1996 | Carpenter |

FOREIGN PATENT DOCUMENTS

| AU | WO-00/64238 | * 11/2000 |
|---|---|---|
| EP | 0 332 730 A1 | 9/1989 |

* cited by examiner

Primary Examiner—Peter M. Poon
Assistant Examiner—Floris Copier
(74) Attorney, Agent, or Firm—Craig A. Fieschko, Esq.; DeWitt Ross & Stevens S.C.

(57) ABSTRACT

A flower stem cutting apparatus includes a cutting receptacle wherein a cutting chamber passage is defined, with the cutting chamber passage extending between an open cutting chamber top (wherein plant stems may be inserted for cutting) and an open cutting chamber bottom (from which cut plant stem ends may fall). A cutting blade is movable across the cutting chamber passage, whereby the blade may cut any plant stems therein. A cutting chamber floor is provided, with the cutting chamber floor being movable across the cutting chamber passage below the cutting blade so that it may, when actuated, at least substantially obstruct the cutting chamber passage. As a result, plant stems may be inserted within the cutting chamber passage until they rest on the cutting chamber floor, at which point the cutting blade may be actuated. A fluid conduit opens onto the cutting chamber passage from a point above the cutting blade and cutting chamber floor, so that water dispensed from the fluid conduit may collect in the cutting chamber passage to provide a submerged cut at the cutting blade when the cutting chamber floor is closed. A first bin is situated beneath the bottom of the cutting chamber to capture the water and cut plant stem ends falling from the cutting chamber. The first bin has a foraminated bottom, and a second bin is then situated beneath the first bin so that it may catch the water draining from the first bin's bottom. The cut plant stem ends are therefore maintained in the first bin for easy disposal. The aforementioned fluid conduit extends from the second bin so that water collected in the second bin may be recirculated back to the cutting chamber passage for reuse.

17 Claims, 3 Drawing Sheets

APPARATA AND METHODS FOR SUBMERGED PLANT STEM CUTTING

CROSS-REFERENCE TO RELATED APPLICATIONS

This application claims priority under 35 USC §119(e) to U.S. Provisional Patent Application No. 60/119,996 filed Feb. 12, 1999, the entirety of which is incorporated by reference herein.

FIELD OF THE INVENTION

This invention relates generally to the field of plant stem cutters, and more specifically to plant stem cutters suitable for the cutting of flower stems while they are situated underwater, whereby cut flowers can be re-hydrated and prepared for commercial display or sale (e.g., in the floral industry).

BACKGROUND OF THE INVENTION

It is well established that cut flowers can become dehydrated between the time they are cut at the growing site (e.g., the farm) and the time when they are delivered to a wholesaler or retailer for sale. This delay can be as much as four days, and the degree of dehydration can be sufficient to seriously stress the plants, causing an adverse effect on their subsequent appearance and vase life.

Wholesalers and retailers often counter this shipping-related dehydration by re-cutting the stressed flowers to remove the lower 1–2 inches of stem, thereby reopening the stem's xylem and phloem so that the stem can resume drawing water. The location of the cut must be underwater if the water draw is to be effective or else the cut will draw a large amount of air, causing more rapid dehydration of the plant. Further, a water-submerged cut helps to prevent aerobic bacteria from entering the stem after the cut is made.

The inventor knows of two prior stem cutting apparata which provide submerged plant stem cutting. The apparata are provided as manually-operated tabletop devices which cut flower stems in small bunches. They make use of a hand-operated linkage which drives a straight blade through stems which are inserted in a funnel. The funnel is immersed in a water-filled container to such an extent that the blade cuts the stems at a point below the surface of the water. Thus, the stems will draw water rather than air once they are cut.

A significant problem with the prior apparata are their need for manual strength and stamina on the part of the operator if he/she is to repeatedly actuate the mechanism to cut a large number of flower stems. Another significant problem is the need for frequent manual straining/removal of stems from the water, and the need to frequently refill the water reservoir.

SUMMARY OF THE INVENTION

The invention, which is defined by the claims set forth at the end of this document, is directed to apparata and methods which assist the operator in re-cutting plant stems, including underwater cutting of stems.

A particularly preferred apparatus constructed in accordance with the invention may be summarized as follows. The flower stem cutting apparatus includes a cutting receptacle wherein a cutting chamber passage is defined, with the cutting chamber passage extending between an open cutting chamber top (wherein plant stems may be inserted for cutting) and an open cutting chamber bottom (from which cut plant stem ends may fall). A cutting blade is movable across the cutting chamber passage, whereby the blade may cut any plant stems therein. A cutting chamber floor is preferably provided, with the cutting chamber floor being movable across the cutting chamber passage below the cutting blade so that it may, when actuated, at least substantially obstruct the cutting chamber passage. As a result, plant stems may be inserted within the cutting chamber passage until they rest on the cutting chamber floor, at which point the cutting blade may be actuated; in this case, the distance between the cutting chamber floor and the cutting blade determines the length of stem removed from the plants. A fluid conduit opens onto the cutting chamber passage, preferably from a point above the cutting blade and cutting chamber floor, so that water dispensed from the fluid conduit may collect in the cutting chamber passage to provide a submerged cut at the cutting blade when the cutting chamber floor is closed.

A first bin is situated beneath the bottom of the cutting chamber to capture the water and cut plant stem ends falling from the cutting chamber. The first bin preferably has a foraminated bottom, and a second bin is then situated beneath the first bin so that it may catch the water draining from the first bin's bottom. The cut plant stem ends are therefore maintained in the first bin for easy disposal. The aforementioned fluid conduit extends from the second bin so that water collected in the second bin may be recirculated back to the cutting chamber passage for reuse.

Apart from operating in the mode noted above, it is preferred that the apparatus also allow the user to cut plant stems to any desired length. In this case, the cutting chamber floor is retracted so that it does not obstruct the cutting chamber passage, and the user simply inserts the plant stems into the cutting chamber passage at such a depth relative to the cutting blade that the desired length of stem is removed. In this case, the water is preferably dispensed from the fluid conduit into the cutting chamber passage at such a rate that it collects atop the cutting blade during cutting, thereby maintaining the plant stems underwater during and immediately after their cutting.

DETAILED DESCRIPTION OF PREFERRED EMBODIMENTS OF THE INVENTION

Figure 1:
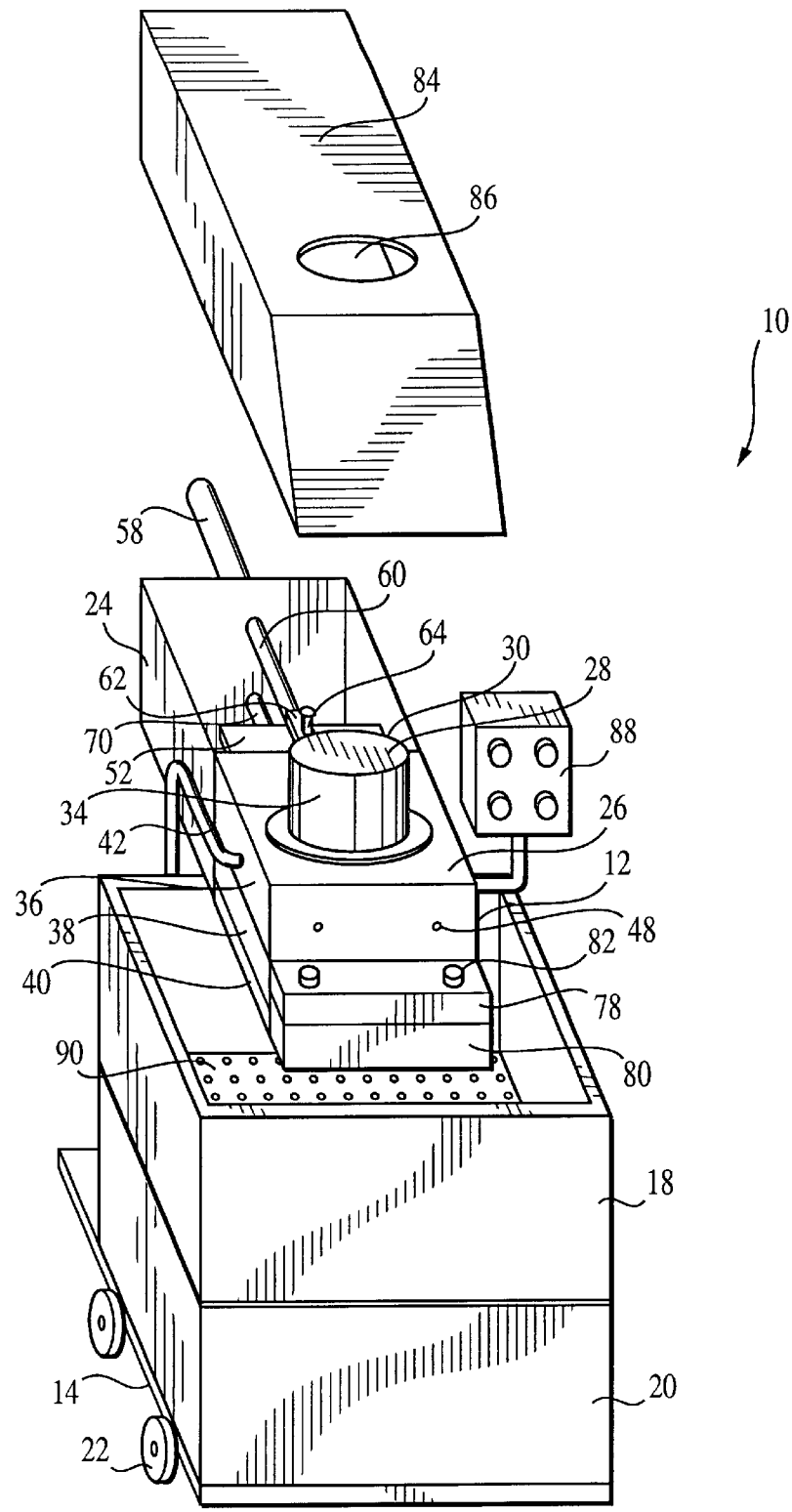
FIG. 1 is a front perspective view of an exemplary (but preferred) version of the plant stem cutting apparatus constructed in accordance with the present invention, shown with its hood 84 removed and suspended over the remainder of the apparatus.
Figure 2:
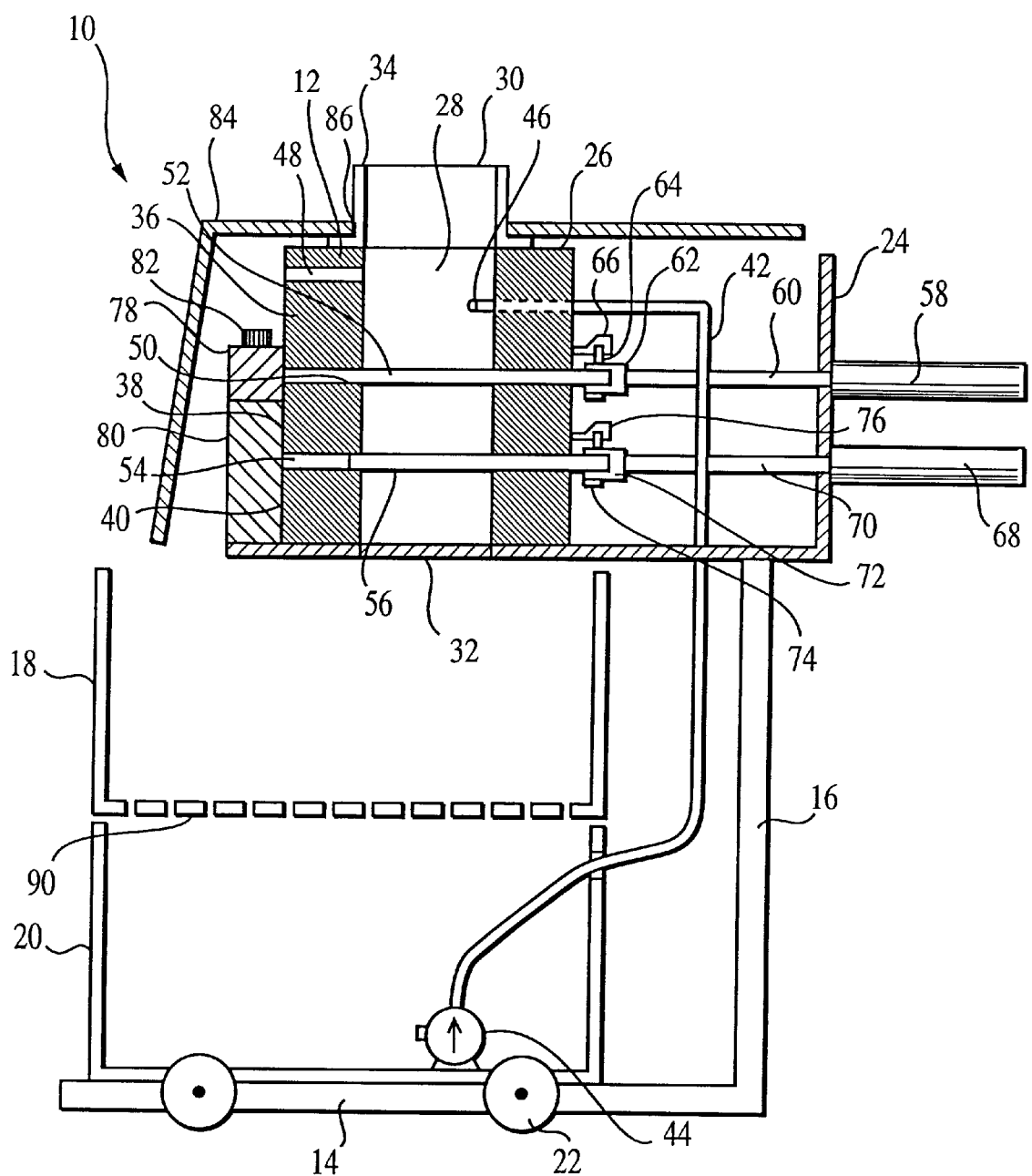
FIG. 2 is a side elevational view of the plant stem cutting apparatus of FIG. 1, shown sectioned about the plane 2—2 in FIG. 1.

Referring to FIGS. 1 and 2 of the drawings, wherein the same features are indicated by the same reference numbers throughout all drawings, an exemplary flower stem cutting apparatus constructed in accordance with the invention is designated generally by the reference numeral 10. The apparatus 10 includes a cutting unit 12 mounted on a wheeled cart base 14 via a cutting unit stanchion 16, and a pair of stackable bins 18 and 20 which are removably borne on the cart base 14 beneath the cutting unit 12. To briefly overview the function of the apparatus 10 prior to discussing its structure in greater detail, the cutting unit 12 receives flower stems (or other plant stems) for cutting, and the cutting is performed while the stems are submerged under water. The cut stems are then deposited by the cutting unit 12 into the first bin 18, while any water received by the first bin 18 will flow into the second bin 20. Water from the second bin 20 may then be recirculated back to the cutting unit 12 for use in the cutting of subsequent plant stems.

Referring particularly to FIG. 2, the cart base 14 is rendered mobile by the use of cart base wheels 22, and thus the apparatus 10 may be rolled to different locations (e.g., to areas where different flowers or plants are located, to areas where water sources or drains are available, etc.). The cutting unit stanchion 16 suspends the cutting unit 12 over the platform of the cart base 14 whereupon the first bin 18 and the second bin 20 are situated.

Turning specifically to the cutting unit 12, and referring particularly to FIG. 2, the cutting unit 12 is affixed to the cutting unit stanchion 16 by a cutting unit frame 24. The cutting unit frame 24 serves as a chassis for various parts of the cutting unit 12 which will be described in forthcoming passages. At the portion of the cutting unit 12 distant from the cutting unit stanchion 16 (i.e., at that portion situated over the cart base 14), a cutting receptacle 26 is provided for receiving and cutting plant stems within a cutting chamber passage 28. The cutting chamber passage 28, which preferably takes the form of a cylindrical void, has an open cutting chamber top 30 and an open cutting chamber bottom 32, with several components defining the cutting chamber passage 28 therebetween: a cutting receptacle funnel 34 situated at the top of the cutting receptacle 26, and defining the open cutting chamber top 30; a first cutting receptacle member 36 whereupon the cutting receptacle funnel 34 is mounted; a second cutting receptacle member 38 situated beneath the first cutting receptacle member 36; and a third cutting receptacle member 40 situated below the second cutting receptacle member 38, and which is situated at or near the open cutting chamber bottom 32. Each of these components will be described in greater detail later in this document.

The cutting receptacle funnel 34, which is preferably made of stainless steel or some other corrosion-resistant, easy-to-clean material, is preferably configured as a tubular or converging funnel-like conduit. The cutting receptacle funnel 34 preferably has a flange at its bottom so that it may be easily attached to the first cutting receptacle member 36, or is configured so that its bottom may be inserted about the perimeter of the cutting chamber passage 28 within the first cutting receptacle member 36, or is otherwise configured for attachment to the first cutting receptacle member 36. When cutting is performed, the plant stems are inserted within the cutting receptacle funnel 34 to direct them along the cutting chamber passage 28.

Turning to the first cutting receptacle member 36 as illustrated in FIG. 2, it is seen that a fluid conduit 42 leads from a pump 44 situated in the second bin 20, extends through the exterior of the first cutting receptacle member 36 (as can also be seen in FIG, 1), and opens onto a conduit opening 46 in the cutting chamber passage 28. Thus, water can be pumped from the second bin 20 into the cutting chamber passage 28 at the first cutting receptacle member 36. At the opposite side of the cutting chamber passage 28 within the first cutting receptacle member 36, a pair of overflow passages 48—both of which are visible in FIG. 1, but which are only partially visible in FIG. 2—lead from the cutting chamber passage 28 to the exterior of the first cutting receptacle member 36, preferably at a height higher than the conduit opening 46. As a result, if the cutting chamber passage 28 is filled with water (as will be discussed below), water flowing from the conduit opening 46 will collect to some extent within the cutting chamber passage 28 (if it is obstructed), and will not immediately flow from the overflow passages 48.

Figure 3:
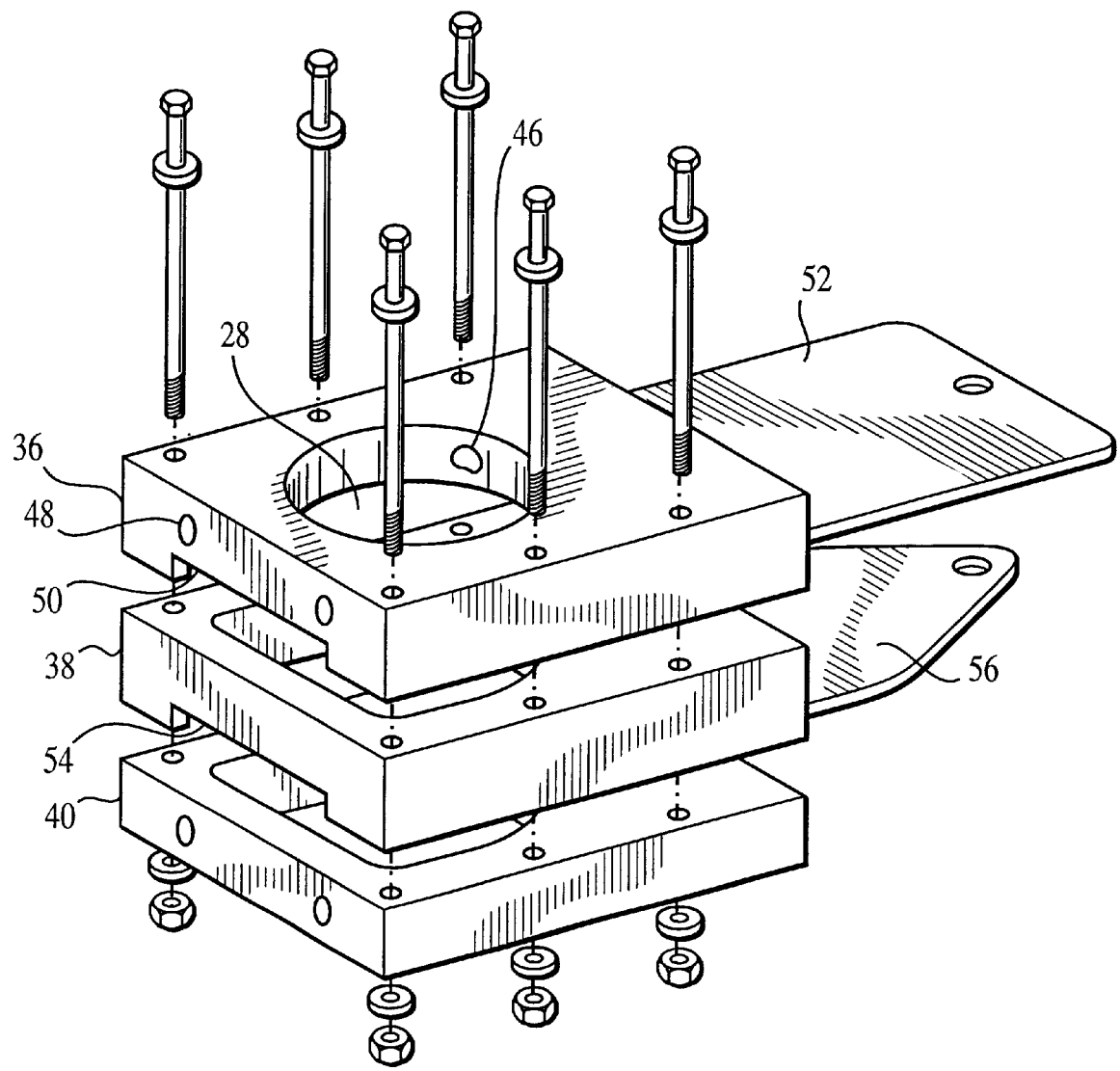
FIG. 3 is an exploded perspective view of certain components of the cutting receptacle 26 shown in FIGS. 1 and 2.

As best illustrated in FIG. 3, the first, second, and third cutting receptacle members 36, 38, and 40 are configured such that when they abut each other in the manner illustrated in FIGS. 1–2 to define the cutting chamber passage 28 between the cutting chamber top 30 and the cutting chamber bottom 32, passages are defined between them for accommodating certain components. Between the first cutting receptacle member 36 and the second cutting receptacle 38, a blade passage 50 is defined wherein a generally planar cutting blade 52 may slide. Between the second cutting receptacle member 38 and the third cutting receptacle member 40, a floor passage 54 is defined wherein a plate-like cutting chamber floor 56 may slide, preferably along a path substantially parallel to that along which the cutting blade 52 slides.

The cutting blade 52 is preferably a plate-like straight-edged cutting blade 52 having a double-beveled cutting edge. If desired, the cutting edge may be provided as a removable attachment or insert which is screwed or otherwise removably attached to a plate, whereby the combination of the cutting edge and plate form the cutting blade 52 illustrated in FIGS. 1 and 2. The cutting blade 52 is connected to a driving means for driving the cutting blade across the cutting chamber passage 28, with FIGS. 1 and 2 illustrating this cutting blade driving means as being provided by a blade pneumatic cylinder 58. However, other driving means may be used instead, e.g., hydraulic actuators, electromechanical actuators, mechanical linkages, etc. The blade pneumatic cylinder 58 has a drive rod 60 terminating in a blade drive rod yoke 62 wherein the butt end of the cutting blade 52 is received and affixed by a means of a removable blade pin 64. The blade pin 64 is maintained in place by means of a removable cotter pin 66. Removal of the cotter pin 66 allows for removal of the blade pin 64, at which point the blade drive rod 60 will no longer be affixed to the butt end of the cutting blade 52. As will be discussed later, the ability to remove the cutting blade 52 from the blade pneumatic cylinder 58 and its associated components allows the cutting blade 52 to be easily removed for sharpening, replacement, or other maintenance.

Similarly, the cutting chamber floor 56 is preferably removably affixed to floor driving means for moving the cutting chamber floor 56 across the cutting chamber passage 28. The floor driving means are illustrated in FIGS. 1 and 2 as being provided in the form of a floor pneumatic cylinder 68. The floor pneumatic cylinder 68 includes a floor drive rod 70, which is connected to the butt end of the cutting chamber floor 56 at a floor drive rod yoke 72. The floor drive rod yoke 72 has a floor pin 74 removably maintained therein by means of a removable floor cotter pin 76.

At the end of the cutting unit 12 opposite the blade pneumatic cylinder 58 and the floor pneumatic cylinder 68, removable blocks 78 and 80 are situated across the ends of the blade passage 50 and floor passage 54 at the exterior of the cutting receptacle 26. The blade block 78 rests across the end of the blade passage 50 outside the first cutting receptacle member 36 and second cutting receptacle member 38, and thereby prevents access to the blade passage 50 from the exterior of the cutting receptacle 26 during ordinary operating conditions. Similarly, the floor block 80 obstructs access to the floor passage 54 outside the second cutting receptacle member 38 and the third cutting receptacle member 40 so that access cannot be gained to the floor passage 54 during ordinary operating conditions. As illustrated in FIGS. 1 and 2, the thumbscrew 82 may removably affix the blade block 78 to the floor block 80, which may be bolted or otherwise affixed to the cutting unit frame 24 and/or the exterior of the cutting receptacle 26. Alternatively, if desired, both the blade block 78 and floor block 80 may be made easily removable by use of thumbscrews 82 affixing the blade block 78 and floor block 80 to the cutting unit frame 24 and/or the various members 36, 38, 40 of the cutting receptacle 26.

If the cutting blade 52 is to be removed (e.g., for replacement or sharpening), this may be readily accomplished by removing the blade block 78, removing the blade cotter pin 66 and blade pin 64 so that the cutting blade 52 is no longer affixed to the drive rod 60, and then simply pushing the cutting blade 52 forwardly so that it extends out of the portion of the blade passage 50 formerly obstructed by the blade block 78. If the cutting chamber floor 56 requires removal, it can be removed in generally the same fashion as the cutting blade 52 once the floor block 80 is removed. Replacement and reassembly of the cutting blade 52 and/or cutting chamber floor 56 is done by reversing the steps required for their removal.

Looking to both FIGS. 1 and 2, it is noted that during normal operation of the apparatus 10, the cutting blade 52 and cutting chamber floor 56 traverse the cutting chamber passage 28 between a fully extended position (as shown in approximate form in FIG. 2), and a fully retracted position (not shown) wherein the forward ends of the cutting blade 52 and cutting chamber 56 extend only slightly into the cutting chamber passage 28 (or are slightly withdrawn from the cutting chamber passage 28). Therefore, the cutting edge of the cutting blade 52 is only exposed within the cutting chamber passage 28, an area in which the operator is not to insert his/her hands.

Looking to FIGS. 1 and 2, the blade drive rod 60 and floor drive rod 70 are left easily accessible within the cutting unit frame 24 so that the blade pin 64 and floor pin 74 are easily accessible, and so that general maintenance is easily performed. However, to prevent access to the area wherein the blade drive rod 60 and floor drive rod 70 reciprocate during ordinary operation, a removable hood 84 is provided to fit over the cutting unit 12, with the cutting receptacle funnel 34 protruding through a hood aperture 86. So that users do not operate the apparatus 10 without the hood 86, it is noted that during ordinary operation, the overflow passages 48 in the first cutting receptacle member 36 will receive some of the water being ejected from the conduit opening 46, thereby causing water to eject from the exterior of the cutting receptacle 26 at the overflow passages 48 at the front of the machine. Therefore, a user must operate the apparatus 10 with the hood 84 if he/she wishes to avoid being sprayed with water.

Several steps for removal and replacement of the cutting blade 52 were previously described. In order to further enhance user safety, it is desirable to have air supply lines (for the pneumatic cylinders 58 and 68) pass through the hood 84 before they connect to the apparatus 10 (it being noted that such an arrangement is not shown in the Figures, which omit illustration of most air and water supply lines for the sake of clarity). Therefore, in order to access the cutting blade 52 and other components, the hood 84 must be removed, which requires disconnection of the air supply lines—thereby effectively disabling actuation of the cutting blade 52 and cutting chamber floor 56.

A control box 88 is provided at one side of the cutting unit 12 for the user's operation of the apparatus 10. The control box 88 preferably provides the user with the option to implement a variety of functions which are described at greater length below, which functions can be implemented by use of standard control circuits/mechanisms or programmable logic controllers. The control box 88 is preferably provided with a standard electrical cord and connection to power the apparatus 10, including the logic circuits, the solenoids for the cylinders 58 and 68, and the pump 44, which is preferably provided with an electrical supply that is switched at the control box 88.

The first bin 18 and second bin 20 are stacked beneath the cutting unit 12. The first bin 18 has a foraminated first bin bottom 90 whereby the first bin 18 will receive both water and cut stem ends falling from the open bottom 32 of the cutting chamber passage 28, but whereby the cut stem ends will be retained in the first bin 18 with the water passing to the second bin 20. Thus, the first bin 18 will retain the cut stem ends so that they may be easily removed for disposal or composting, whereas the water passing into the second bin 20 can be recirculated to the cutting chamber passage 28 by the pump 44 and fluid conduit 42. The second bin 20 should include an aperture in its side, a notch near its top wall, or some other passage whereby the fluid conduit 42 may extend into the second bin 20 in such a manner that the fluid conduit 42 (and the pump 44) may be easily removed for later cleaning and/or maintenance. The second bin 20 preferably includes a protruding faucet or other valved discharge opening so that the cart base 14 may be wheeled so that the discharge opening can be situated over a drain, at which point the valve may be opened to drain the second bin 20.

The apparatus 10 preferably allows operation in at least two modes, both of which may be summarized as follows.

Flush Mode

In the flush mode, the cutting chamber floor 56 is used to at least partially seal the cutting chamber passage 28 near its bottom 32, allowing the cutting chamber passage 28 to fill with water from the conduit opening 46. Plant stems are inserted into the cutting receptacle funnel 34 until the stems contact the cutting chamber floor 56. The user's activation of the cutting function on the control box 88 will then send pressurized air to the blade pneumatic cylinder 58, which will drive the cutting blade 52 through the plant stems. However, the control box 88 will preferably incorporate a timer or other mechanism which will not allow cutting to occur until the water level within the cutting chamber passage 28 rises above the height of the cutting blade 52; most desirably, the cutting blade 52 is not enabled until the water level reaches the height of the overflow passages 48. When the water reaches the overflow passages 48, it flows out of the cutting chamber passage 28 to strike the inside of the hood 84, where it is deflected downwardly into the first bin 18.

After cutting, the cutting blade 52 automatically retracts. At the same time, the cutting chamber floor 56 is pulled to its retracted position by the floor pneumatic cylinder 68, causing the water and cut stem ends in the cutting chamber passage 28 to fall into the first bin 18 below. Stems are trapped in the first bin 18 while the water drains through the first bin bottom 90 into the second bin 20. The water is then recirculated through the fluid conduit 42 by the pump 44. Water may be replenished through water lines (not shown) leading to the fluid conduit 42, the second bin 20, or other portions of the fluid circuit. After a short time delay the cutting chamber floor 56 is pushed forward by the floor pneumatic cylinder 68 to reseal the cutting chamber passage 28 and reset the cutting sequence.

It is noted that the spacing between the cutting blade 52 and the cutting chamber floor 56 limits the length that can be cut from a stem, allowing the removal of enough stem length to reopen the stem and establish a water draw, but preventing the user from shortening the stems too much (which reduces their sales value). Advantageously, when cutting occurs, the force of the cutting blade 52 extending through the cutting chamber passage 28 may cause the stems to slightly bend within the cutting chamber passage 28, thereby creating an angled cut on the stems (i.e, one which is not perpendicular to the stem axis). This is beneficial insofar as an angled cut has greater surface area, thereby allowing the plant to more efficiently draw water.

Flood Mode

In the flood mode, the cutting chamber floor 56 is kept open so water is free to flood continuously through the cutting chamber passage 28. The continuous flood of water into the cutting chamber passage 28 and onto the cutting blade 52 causes the water to "pile up" on and cover the cutting blade 52 as it moves across the cutting chamber passage 28 and through the plant stems. This brings a continuous volume of water into immediate contact with the newly-exposed stem xylem, allowing the stems to draw water as they are cut. Since the restriction established by the relative positions of the cutting chamber floor 56 and the cutting blade 52 plate is removed, the user can position the plant stems relative to the level of the cutting blade 52 so as to cut and remove any desired length from the stems.

Other Features

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, while FIGS. 1 and 2 illustrate a simple arrangement for the mounting of the wheels 22 about the sides of the cart base 14, it should be understood that the wheels 22 could be mounted beneath the cart base 14; that some or all of them could be provided as rotatable, steerable casters; that telescoping legs, wheel locks, or other braking devices could be incorporated to render the cart base 14 immobile; and wheels (or the feature of mobility in general) is not required to realize many of the advantages of the invention.

Second, it is noted that since water may enter the blade passage 50 and/or floor passage 54, which could then hinder insertion of the cutting blade 54 into the blade passage 50 and the cutting chamber floor 56 into to the floor passage 54 if the water is not permitted a means to escape as the blade 52 and floor 56 are inserted. Therefore, it is preferred that the blade passage 50 not be configured to fully receive the cross-sectional area of the cutting blade 52, and that it be slightly wider than the cutting blade 52 to allow the escape of water. Similarly, it is preferred that the floor passage 54 be slightly wider than the cutting chamber floor 56.

Third, the safety feature whereby a user must operate the apparatus 10 with the hood 84 installed in order to avoid being sprayed with water from the overflow passages 48 may be defeated, as by providing deflectors over the overflow passages 48, or simply diverting the overflow passages 48 so that they eject directly into the first bin 18. However, it is felt that the safety feature significantly contributes towards user health and safety, therefore this feature is preferably maintained.

Fourth, it is possible that only a single bin may be used in place of the first and second bins 18 and 20, and it may collect both water and cut plant stem ends. In this case, the fluid conduit 42 may still lead from the bin, but strainers should be included to prevent cut plant stems from clogging the fluid conduit.

The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A flower stem cutting apparatus comprising:
   a. a cutting receptacle having a cutting chamber passage defined therein, the cutting chamber passage extending between an open cutting chamber top and an open cutting chamber bottom,
   b. a cutting blade which is movable across the cutting chamber passage, whereby the blade may cut any plant stems therein,
   c. a cutting chamber floor which is movable across the cutting chamber passage below the cutting blade, whereby the cutting chamber floor may at least substantially obstruct the cutting chamber passage.

2. The flower stem cutting apparatus of claim 1 further comprising a fluid conduit opening onto the cutting chamber passage above the cutting chamber floor.

3. The flower stem cutting apparatus of claim 2 wherein the fluid conduit is located above the cutting blade.

4. The flower stem cutting apparatus of claim 2 further comprising a bin situated beneath the cutting chamber bottom, wherein the fluid conduit extends from the bin.

5. The flower stem cutting apparatus of claim 1 further comprising blade driving means for moving the cutting blade across the cutting chamber passage, wherein the cutting blade is removably connected to the blade driving means.

6. The flower stem cutting apparatus of claim 5 wherein:
   a. while the cutting blade is connected to the blade driving means, the cutting blade is movable across the cutting chamber passage from one side of the cutting chamber to exit the opposite side;
   b. the cutting blade is removable from the opposite side of the cutting chamber once it is removed from the blade driving means.

7. The flower stem cutting apparatus of claim 1 further comprising:
   a. a first bin situated beneath the cutting chamber passage whereby it receives any cut plant stems falling therefrom, the first bin having at least one drainage aperture in its bottom;
   b. a second bin situated beneath the first bin to receive any fluid draining from the drainage aperture.

8. The flower stem cutting apparatus of claim 7 further comprising a fluid conduit leading from the second bin to the cutting chamber passage.

9. A flower stem cutting apparatus comprising:
   a. a cutting receptacle having a cutting chamber passage defined therein, the cutting chamber passage extending between an open cutting chamber top and an open cutting chamber bottom,
   b. a cutting blade which is movable across the cutting chamber passage, whereby the blade may cut any plant stems therein, c. a first bin situated beneath the cutting chamber passage whereby it receives any cut plant stems falling therefrom, the first bin having at least one drainage aperture in its bottom;

d. a second bin situated beneath the first bin to receive any fluid draining from the drainage aperture.

10. The flower stem cutting apparatus of claim 9 further comprising a fluid conduit leading from the second bin to the cutting chamber passage.

11. The flower stem cutting apparatus of claim 9 further comprising a fluid conduit opening onto the cutting chamber passage above the cutting blade.

12. The flower stem cutting apparatus of claim 9 further comprising a cutting chamber floor which is movable across the cutting chamber passage below the cutting blade, whereby the cutting chamber floor may at least substantially obstruct the cutting chamber passage.

13. The flower stem cutting apparatus of claim 9 further comprising blade driving means for moving the cutting blade across the cutting chamber passage, wherein the cutting blade is removably connected to the blade driving means.

14. The flower stem cutting apparatus of claim 13 wherein:

a. while the cutting blade is connected to the blade driving means, the cutting blade moves across the cutting chamber passage from one side of the cutting chamber to exit the opposite side;

b. the cutting blade is removable from the opposite side of the cutting chamber once it is removed from the blade driving means.

15. A flower stem cutting apparatus comprising:

a. a cutting receptacle having a cutting chamber passage defined therein, the cutting chamber passage extending between an open cutting chamber top and an open cutting chamber bottom, b. a cutting blade which is movable across the cutting chamber passage, whereby the blade may cut any plant stems therein, c. a bin situated beneath the open cutting chamber bottom;

d. a fluid conduit opening onto the cutting chamber passage above the cutting blade, wherein the fluid conduit extends from the bin.

16. The flower stem cutting apparatus of claim 15 wherein the bin is a second bin, and wherein a first bin is included beneath the open cutting chamber bottom and above the second bin, the first bin having a foraminated bottom whereby fluid in the first bin may drain into the second bin.

17. The flower stem cutting apparatus of claim 15 further comprising a cutting chamber floor which is movable across the cutting chamber passage below the cutting blade.

* * * * *